United States Patent [19]
Komura et al.

[11] Patent Number: 5,575,897
[45] Date of Patent: *Nov. 19, 1996

[54] METHOD OF MANUFACTURING SOFT-MAGNETIC MULTILAYER THIN FILM INCLUDING RE-DISSOLUTION EFFECT MAGNETICALLY ISOLATING LAYER

[75] Inventors: Nobuyuki Komura, Kyoto; Yuuji Omata, Toyonaka, both of Japan

[73] Assignee: Matsushita Electric Industrial Co., Ltd., Japan

[ * ] Notice: The term of this patent shall not extend beyond the expiration date of Pat. No. 5,494,563.

[21] Appl. No.: 547,560

[22] Filed: Oct. 24, 1995

Related U.S. Application Data

[62] Division of Ser. No. 144,436, Nov. 2, 1993, abandoned.

[30] Foreign Application Priority Data

Nov. 2, 1992 [JP] Japan ..................... 4-294108

[51] Int. Cl.$^6$ ....................................... C25D 5/10
[52] U.S. Cl. ........................... 205/103; 205/119
[58] Field of Search ..................... 205/103, 119

[56] References Cited

U.S. PATENT DOCUMENTS

| | | | |
|---|---|---|---|
| 4,587,176 | 5/1986 | Carcia | 428/611 |
| 4,663,685 | 5/1987 | Tsang | 360/113 |
| 4,929,514 | 5/1990 | Natarajan et al. | 428/611 |
| 5,001,586 | 3/1991 | Aboaf et al. | 360/113 |
| 5,057,380 | 10/1991 | Hayashi et al. | 428/611 |
| 5,236,791 | 8/1993 | Yahisa | 428/611 |

*Primary Examiner*—Kathryn Gorgos
*Assistant Examiner*—Kishor Mayekar
*Attorney, Agent, or Firm*—Wenderoth, Lind & Ponack

[57] ABSTRACT

A soft-magnetic multilayer thin film produced by electroplating, wherein an anode-dissolution process is effected by intermittently applying a reverse d.c. bias current with respect to the plating-forward current. Involving the anode-dissolution process allows the formation of a re-dissolution effect layer differing in crystal structure from the plated film layer. A soft-magnetic multilayer thin film characterized by having a multilayer film structure which comprises a plated layer and a re-dissolution effect layer laminated to each other and which the plated layer is at least magnetically isolated. Further, a method of manufacturing a soft-magnetic multilayer thin film having a multilayer film structure magnetically isolated only through plating, which is offered by introducing the anode-dissolution process. In a thin-film magnetic head produced by using a soft-magnetic multilayer thin film, the soft-magnetic multilayer thin film serves as at least one of an upper magnetic core layer and a lower magnetic core layer.

3 Claims, 6 Drawing Sheets

METHOD OF MANUFACTURING SOFT-MAGNETIC MULTILAYER THIN FILM INCLUDING RE-DISSOLUTION EFFECT MAGNETICALLY ISOLATING LAYER

This is a divisional application of Ser. No. 08/144,436, filed Nov. 2, 1993, now abandoned.

BACKGROUND OF THE INVENTION

1. Field of the Invention

The present invention relates to a soft-magnetic multilayer thin film for use in a thin-film magnetic head for high-density magnetic recording, and also relates to a method of manufacturing the same.

2. Description of the Prior Art

As a soft-magnetic layer of a thin-film magnetic core to be used in a HDD (Hard Disk Drive)-oriented thin-film magnetic head for magnetically recording data with high density, a Permalloy magnetic thin film produced by an electroplating method has been most widely used, conventionally. The manufacturing method by electroplating has been hitherto utilized taking the advantage of its capability of enhancing accuracy of soft-magnetic thin-film magnetic core patterns. However, an electroplating method, as applied to thin-film magnetic head cores, has been limited to applications to a Permalloy (Ni-Fe alloy) magnetic thin film because of its difficulty in alloy plating. In this connection, it has been revealed that, with use of a large amount of electric current for alloy plating, it is possible to obtain multi-element soft-magnetic alloy thin films, composed of such as Co-Fe-Cr, Fe-Co-Ni-Cr alloy and the like through electroplating method, which the soft-magnetic alloy thin films are high enough in saturation magnetic flux density to be suitable for high-density recording magnetic heads.

A Permalloy magnetic thin film produced by the electroplating method or multi-element soft-magnetic alloy thin films with high saturation magnetic flux density obtainable by the electroplating method, in particular, plating with use of a large amount of electric current as above mentioned have been involved with problems as following. That is, there occur minute depressions or protruded abnormally grown spots on the thin film surface due to hydrogen foaming or the like, which may adversely affect the magnetic characteristics, for example by causing the coercive force of magnetic core thin-film layers to increase, or obstructing the movement of magnetic domain walls.

Meanwhile, it is known that a multilayer film structure at least magnetically isolated in the direction of film thickness of the thin film is effective to enhance the high-frequency characteristic and to prohibit the magnetic domain structure of a magnetic core from being subdivided within the thin-film plane, based on the magnetic domain evaluation of laminated-film cores composed of a soft-magnetic thin film such as of Permalloy and a thin non-magnetic layer obtained by deposition. However, any practical method has not been known yet by which the whole multilayer film can be prepared through electroplating.

SUMMARY OF THE INVENTION

Accordingly, an essential objective of the present invention is to provide a soft-magnetic multilayer thin film for use in a thin-film magnetic head, which can be obtained only through electroplating. Another objective of the present invention is to provide a manufacturing method for the same soft-magnetic multilayer thin film, capable of improving the magnetic characteristics and high-frequency characteristics and controlling or singularizing the magnetic domain structure of a magnetic core.

In order to achieve the aforementioned objective, the present invention provides a soft-magnetic multilayer thin film which comprises: one or more soft-magnetic plated thin film layers formed through plating; and one or more re-dissolution effect layers obtained through anode-dissolution each having its crystal structure different from that of the soft-magnetic plated film layer, the two types of film layers being alternately laminated each other, where the soft-magnetic plated film layers are magnetically isolated to each other by provided the re-dissolution effect layers alternately interlaminated therebetween. In the soft-magnetic multilayer film of the present invention, the re-dissolution effect layer resulting from anode-dissolution is amorphous.

The present invention also provides a method of manufacturing the same soft-magnetic multilayer thin film, which comprises: the step of intermittently effecting an anode-dissolution process in the course of forming the soft-magnetic plated film thereby to alternately form one or more re-dissolution effect layers between the soft-magnetic plated film layers through anode-dissolution; and the step of forming a soft-magnetic multilayer thin film in which the laminated soft-magnetic plated film layers are magnetically isolated to each other by the interlaminated re-dissolution effect layers.

In the method of the present invention, a target to be plated is positioned as a cathode in the electroplating method with a d.c. current forwarding the plating process (referred to as, "plate-forwarding current" hereinafter), while a d.c. bias current intermittently supplied in the reverse direction (referred to as, "reverse d.c. bias current" hereinafter) with respect to that of the plate-forwarding current is set in value to be smaller than the plate-forwarding current, where the target to be plated is subjected to electroplating process under the condition mentioned above.

This plating method makes it possible to obtain a soft-magnetic multilayer thin film having at least a magnetically isolated multilayer film structure which comprises one or more soft-magnetic plated film layers obtained by electroplating the target with the plate-forwarding current, and one or more re-dissolution effect layers each differing in crystal structure from the plated film layer, the re-dissolution effect layers being obtained with the reverse d.c. bias current under the condition that the d.c. bias current in the direction reverse to that of the plate-forwarding current is set to be smaller in value than the plate-forwarding current.

Therefore, according to the present invention, by intermittently effecting the anode-dissolution process in the course of electroplating film formation, one or more re-dissolution effect layers are alternately formed each having its crystal structure different from that of the soft-magnetic plated film layer, making it possible to form a soft-magnetic multilayer thin film having a multilayer film structure which the soft-magnetic plated layers are isolated at least magnetically to each other by providing the interposed re-dissolution effect layers. Further, it is possible to vary the thickness of each of the re-dissolution effect layer differing in crystal structure from the soft-magnetic plated film layer, depending on the time taken for supplying the reverse d.c. bias current for the anode-dissolution. Moreover, by introducing the anode-dissolution process a plurality of times in the whole process of forming the soft-magnetic plated film it is made possible to form a soft-magnetic multilayer film which the number of the layers depends on the number of times of the introduction of the anode-dissolution process.

Furthermore, according to another feature of the present invention, the soft-magnetic multilayer film has at least a magnetically isolated multilayer film structure which comprises one or more soft-magnetic plated film layers and one or more re-dissolution effect film layers alternately laminated, each re-dissolution effect film layer having its crystal structure different from that of the plated film layer, and therefore the high-frequency characteristic and magnetic domain structure within the thin film plane are largely affected. In more detail, generally in a single-layer thin film structure, since the state of the magnetic domain structure has a magnetic pole at an external position of the film and is unstable in energy, the magnetic domain structure of the film forms a magnetization loop within the film plane as shown in FIG. 6($a$). In contrast, in a multilayer film structure having a plurality of magnetic thin layers and a plurality of non-magnetic thin layers alternately laminated to each other, the magnetic domain structure thereof forms a magnetization loop in the film thickness direction of a pair of upper and lower layers as shown in FIG. 6($b$), which the state of the magnetic domain structure is stable in energy. Thus, it has been accomplished to singularize the magnetic domain for the magnetic domain structure within the thin film plane and to improve the high-frequency characteristic by magnetostatically couplings among the multilayer laminated films in the direction of the film thickness.

Also, it is accomplished to improve the magnetic characteristic of the magnetic core in the case of applying the method of the present invention to the process of manufacturing thin-film magnetic head cores, while the output improvement especially on the high band region as well as improvement of noise reduction have been achieved.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

A preferred embodiment of the present invention is now described in more detail with reference to the drawings.

In a method of manufacturing a soft-magnetic multilayer film, anode-dissolution is intermittently effected in the course of forming the soft-magnetic plated film by electroplating to form a re-dissolution effect layer with a d.c. bias current intermittently supplied in the reverse direction with respect to that of a plate-forwarding current, where the reverse d.c. bias current is set in absolute value to be smaller than the plate-forwarding current. The re-dissolution effect layer has its crystal structure different from that of the soft-magnetic plated film layer. Then, alternately formed is a soft-magnetic multilayer thin film in which the laminated soft-magnetic plated film layers are magnetically isolated to each other by the interlaminated re-dissolution effect layers.

Figure 4A:
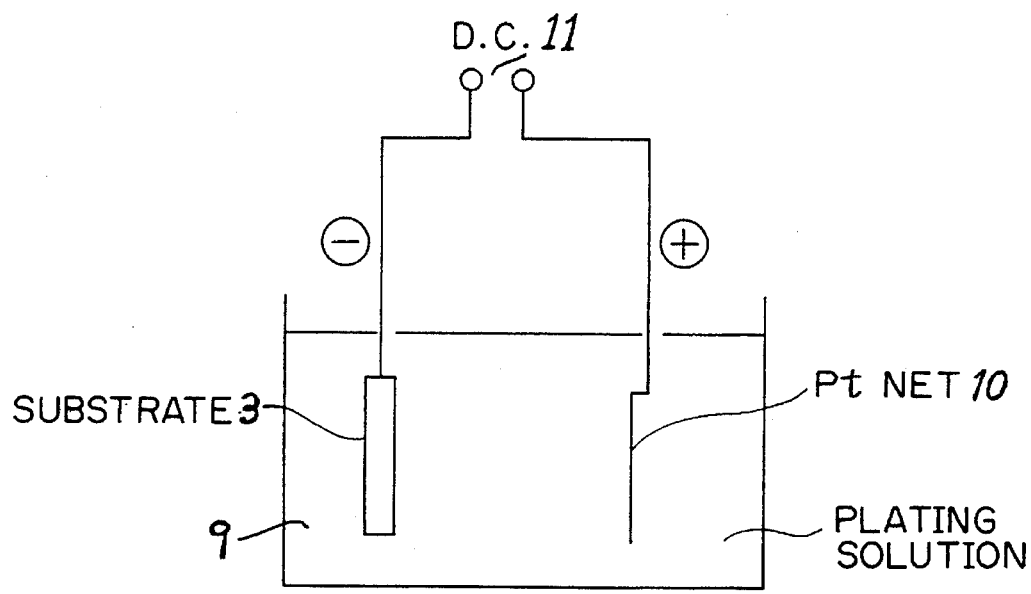
FIGS. 4($a$) and 4($b$) are schematic views showing an electroplating method of the present invention.
Figure 4B:
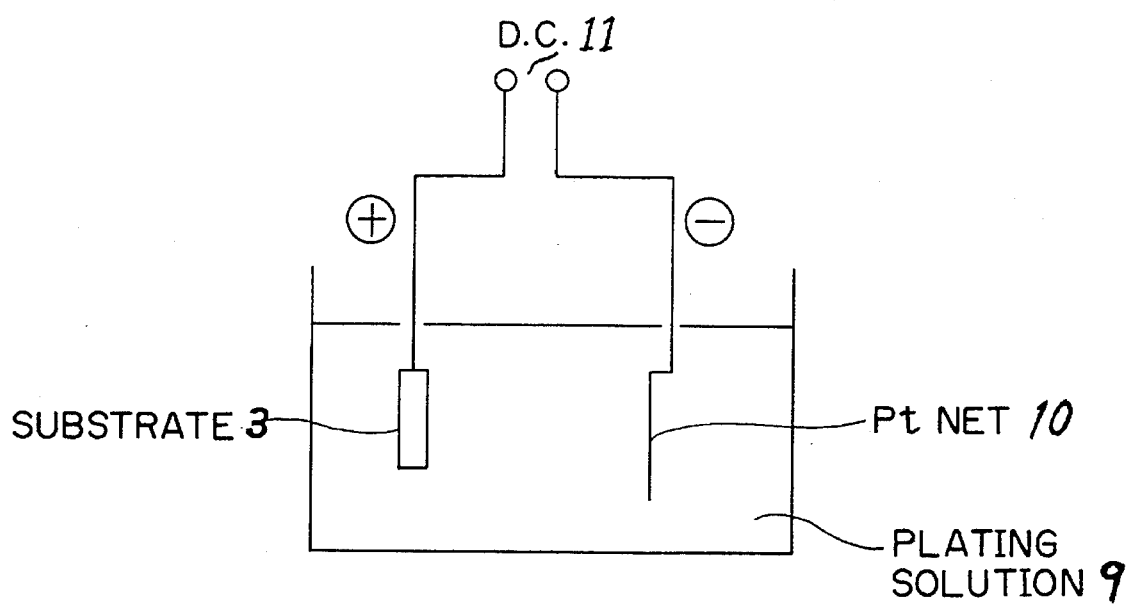
Figure 5A:
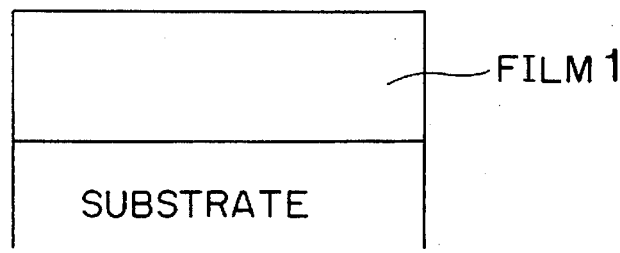
FIGS. 5($a$), 5($b$), 5($c$) and 5($d$) are views showing a process of manufacturing soft-magnetic multilayer films according to the present invention.
Figure 5B:
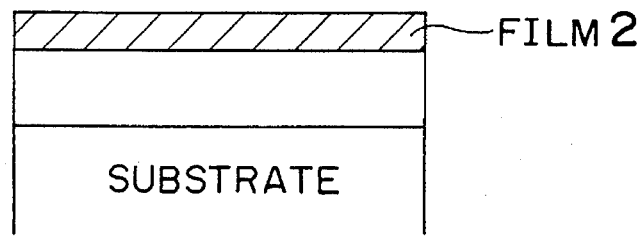
Figure 5C:
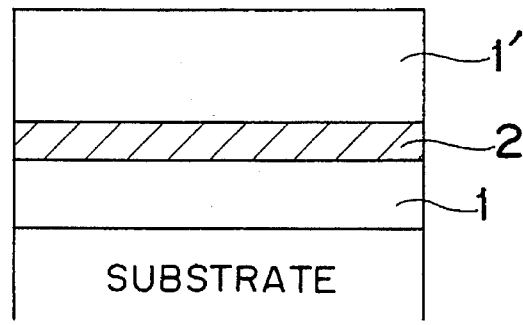
Figure 5D:
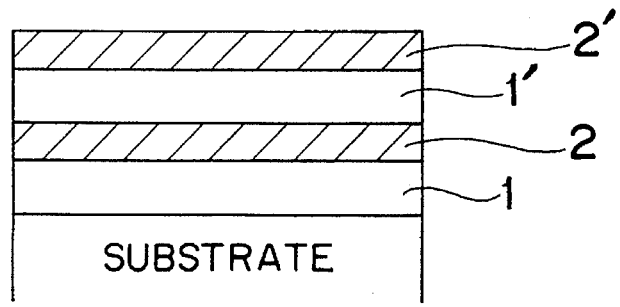
Figure 6A:
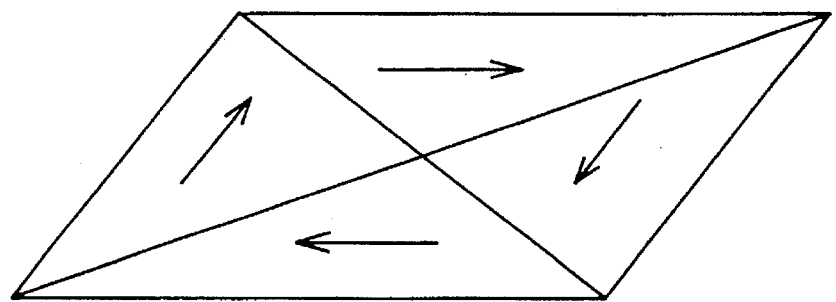
FIGS. 6($a$) and 6($b$) are schematic views showing magnetization loops of a single-layer film structure and a multilayer film structure, respectively.
Figure 6B:
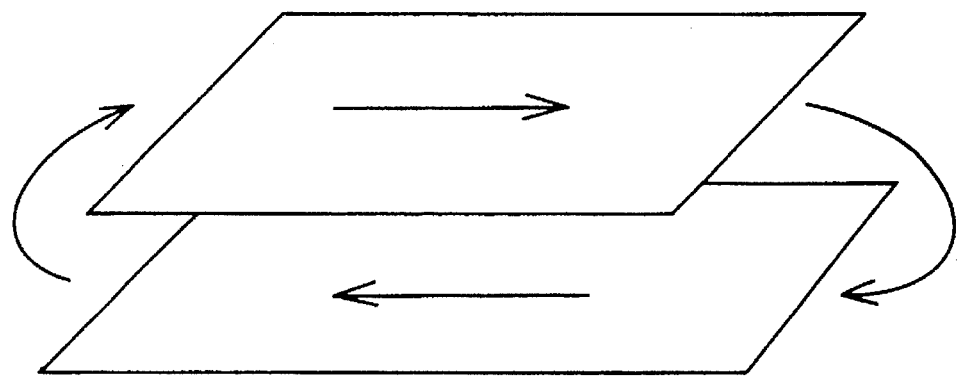

In more detail, as shown in FIG. 4($a$), in the manufacturing method of the present embodiment, a target (i.e., substrate 3) to be plated is positioned as a cathode in the electroplating solution 9 while a Pt net 10 is positioned as an anode in the electroplating solution with supply of d.c. current forwarding the plating process.

Figure 1:
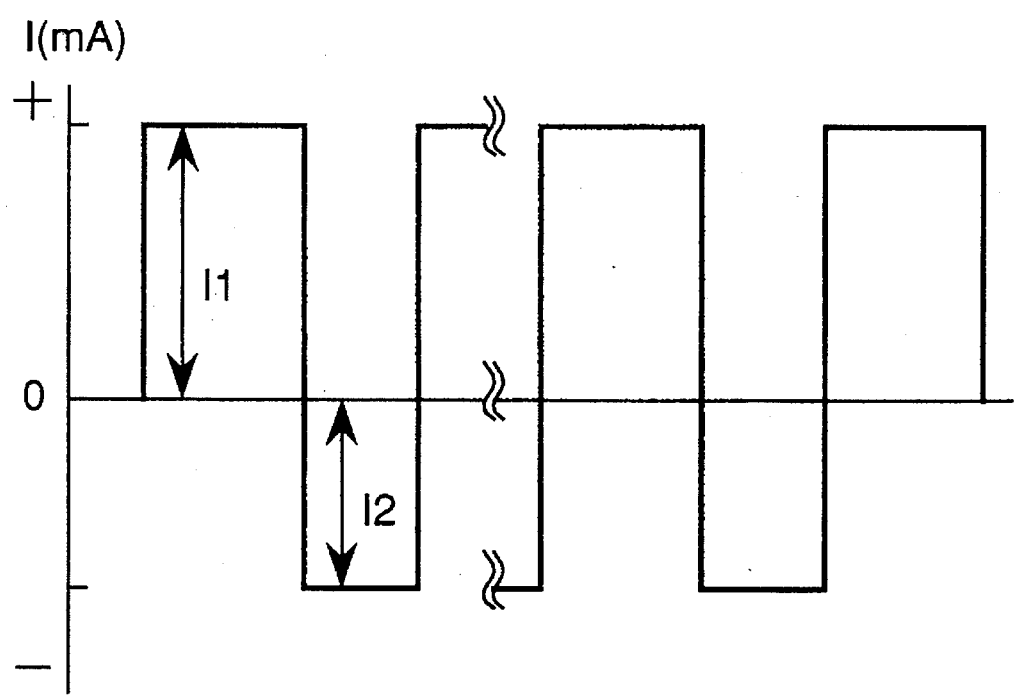
FIG. 1 is a timing chart showing a way of applying a current in the electroplating process for manufacturing soft-magnetic multilayer films according to the present invention.

In the first step, as shown in FIG. 5($a$), a plated film 1 is formed on the substrate 3 by electroplating with supply of a plate-forwarding current $I_1$ of a positive d.c. constant value as shown in FIG. 1, where the substrate 3 is positioned as the cathode and the Pt net is positioned as the anode of a d.c. current supply source 11.

Then, the positive terminal and negative terminal of the d.c. current supply source are reversed to each other as shown in FIG. 4($b$), in other words, the substrate to be plated is positioned as the anode while the Pt net is positioned as the cathode. Under this condition, the plated film 1 just formed on the substrate 3 is partially dissolved in the plate solution with a reverse d.c. bias current $I_2$ of a negative constant value as shown in FIG. 1, which the process is referred to as, "anode-dissolution". In the anode-dissolution process, on the plated film 1, there is formed a re-dissolution effect layer 2 having its crystal structure different from that of the plated film layer 1 as shown in FIG. 5($b$), where the absolute value of the reverse d.c. current $I_2$ is set smaller than that of the plate-forwarding current $I_1$.

Then, the positive and negative terminals of the d.c. current source 11 are reversed to each other to be back to the same state as the first state shown in FIG. 4($a$), where a further plated film layer 1' is formed on the re-dissolution effect layer 2 as shown in FIG. 5($c$).

Then, in the same manner, the positive and negative terminals are reversed to each other to further form a re-dissolution effect layer 2' on the plated film layer 1' as shown in FIG. 5($d$).

Figure 2:
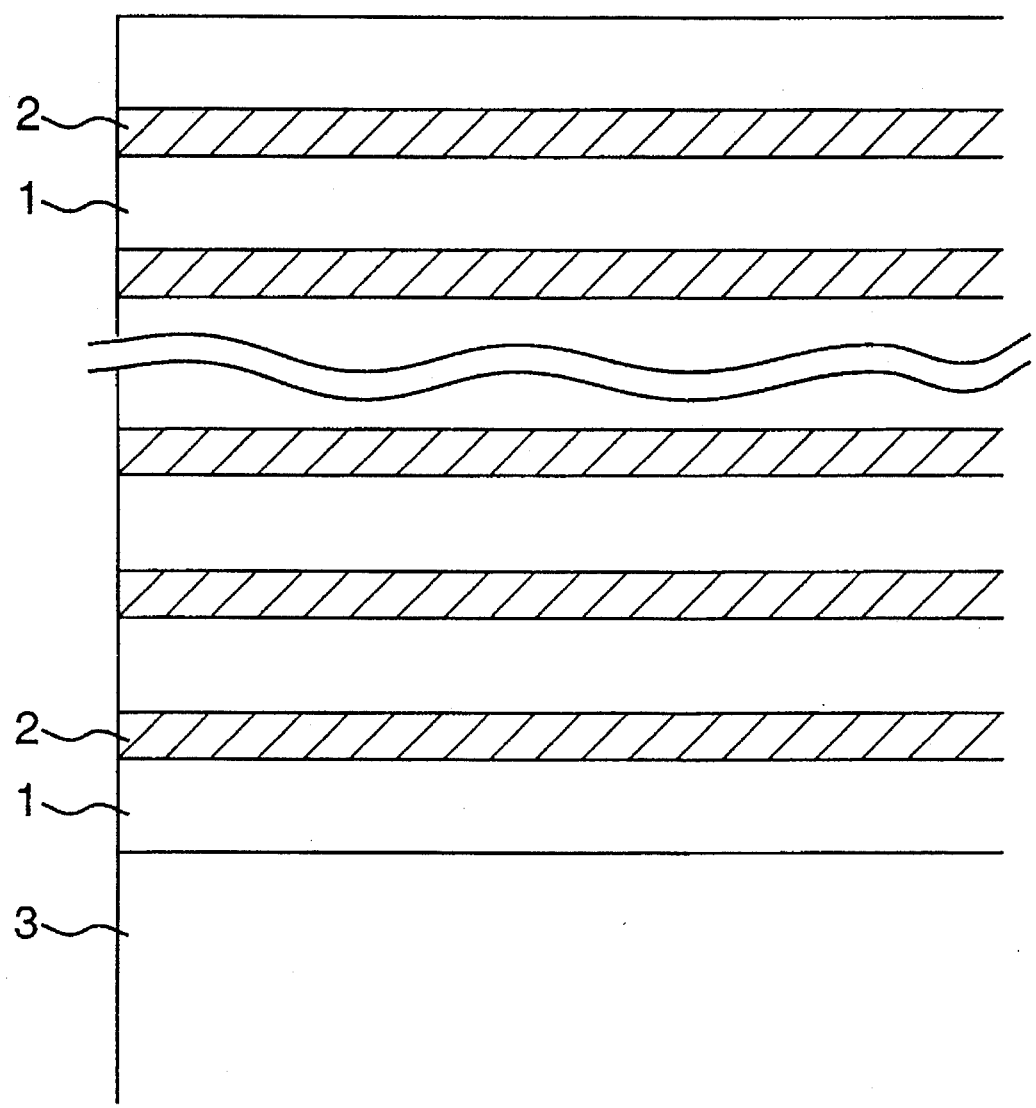
FIG. 2 is a schematic sectional view representing a soft-magnetic multilayer film structure obtained by the manufacturing method according to the present invention.

These processes mentioned above are repeated thereby to alternately laminate the soft-magnetic plated layers 1 and the re-dissolution effect layers 2 to form a soft-magnetic multilayer thin film as shown in FIG. 2, where the soft-magnetic plated film layers 1 are magnetically isolated to each other by the interlaminated re-dissolution effect layers 2.

Table 1 lists the TEM analysis results and magnetic domain structures of Examples 1 through 16 of soft-magnetic plated films formed by an alloy plating process with Permalloy, Co-Fe-Cr ternary (three-element) alloy, Co-Fe binary (two-element) alloy, and Fe-Cr binary (two-element) alloy for the pattern of a top portion of a thin-film magnetic head core, as various examples 1 through 16 where the reverse d.c. bias current $I_2$ is applied in the direction reverse to that of the plate-forwarding current $I_1$ of a constant value with which the plating is forwarded. The magnitude of current I (amplitude) satisfies the equation $I=I_1+I_2$, as shown in FIG. 1.

In table 1, "fcc" denotes a crystal structure of a face centered cubic, "hcp" denotes of a hexagonal closed packed lattice, and "bcc" denotes of a body centered cubic.

From the results of Table 1, it was found that in either case of electroplating with Permalloy, Co-Fe-Cr ternary (three-element) alloy, Co-Fe binary (two-element) alloy, and Fe-Cr binary (two-element) alloy, when the re-dissolution process is introduced by intermittently applying the reverse d.c. bias current, rather than the case of electroplating only with applying the plate-forwarding current, one or more re-dissolution effect layers 2 formed by the re-dissolution of an anode material as shown in FIG. 2 are alternately interlaminated between the soft-magnetic plated layers 1 grown with the plate-forwarding current thereby to form a soft-magnetic multiple layer laminated film, thus providing at least magnetically isolated multilayer film structure in which the soft-magnetic plated layers are magnetically isolated to each other by the interposed re-dissolution effect layers. In this method, the re-dissolution effect layer resulting from anode-dissolution was amorphous, which fact has been found remarkable as compared with the normal plating with only supplying the plate-forwarding current $I_1$ under the condition of $I_2=0$. Also, singularization of magnetic domains has been accomplished by selecting conditions in the method of the present embodiment.

In this embodiment, it is to be noted that the re-dissolution effect layer resulting from anode-dissolution is identical in alloy composition to the soft-magnetic plated layer, otherwise, that the re-dissolution effect layer resulting from anode-dissolution contains iron and at least one element of cobalt, chrome, and nickel in alloy composition.

Table 2 lists the results of the improvements in the soft-magnetization and high-frequency characteristic in the case of plating with Permalloy, Co-Fe-Cr alloy, Co-Fe alloy, and Fe-Cr alloy, when re-dissolution is effected with a reverse d.c. bias current $I_2$ to form the re-dissolution effect layer 2.

From the results of Table 2, it was found that in either case of plating with Permalloy, Co-Fe-Cr alloy, Co-Fe alloy, and Fe-Cr alloy, when re-dissolution is effected with intermittent supply of a reverse d.c. bias current $I_2$, the re-dissolution effect layer 2 formed by the re-dissolution of an anode is combined with a grown plate-forwarding layer 1 formed with the plate-forwarding current thereby to form a multilayer film structure, the multilayer film layers being at least magnetically isolated, which allows the resulting plated multilayer film to be soft-magnetized with improvement of its high-frequency characteristic.

In addition, discussions and further study were also made upon materials of Fe-Co-Ni, Fe-Ni-Cr, and Co-Fe-Cr-Ni alloy films. As a result, in any case, when the re-dissolution process with a reverse d.c. bias current $I_2$ is introduced, a re-dissolution effect layer 2 formed through the re-dissolution of an anode is combined with a soft-magnetic plated layer 1 grown with the plate-forwarding current $I_1$ thereby to form a multilayer film structure, where the soft-magnetic plated thin film layers are at least magnetically isolated by the re-dissolution effect layer, which allows the resulting plated multilayer film to be improved in soft-magnetization with its high-frequency characteristic.

Figure 3:
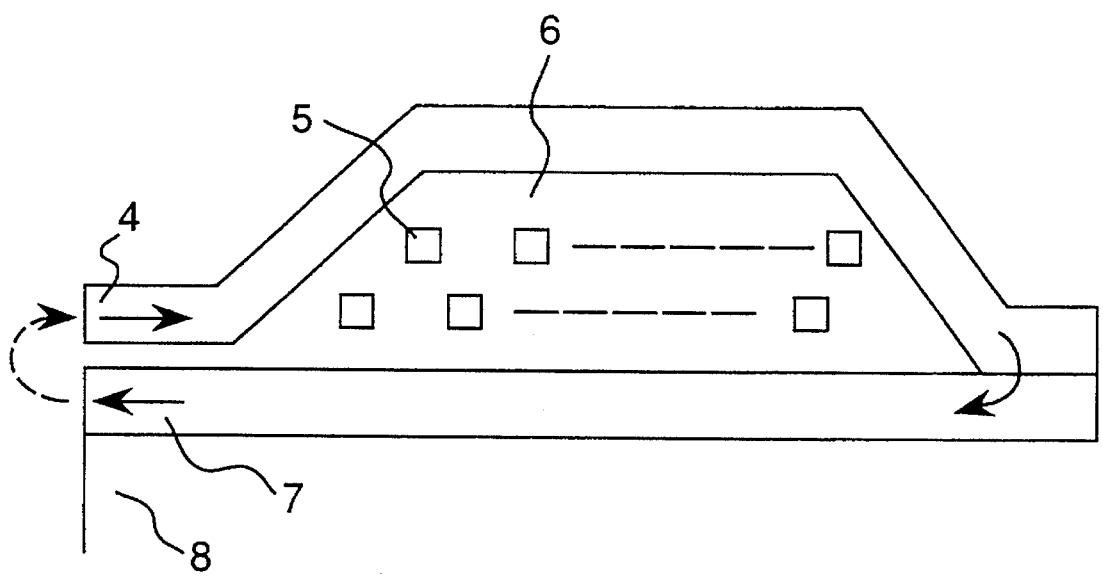
FIG. 3 is a schematic view representing a structure of a thin-film magnetic head provided with a soft-magnetic multilayer plated film of the present invention.

Further, with use of the films of Permalloy, Co-Fe alloy, Fe-Cr alloy, Co-Fe-Cr alloy, Co-Fe-Ni alloy, Fe-Ni-Cr alloy, Co-Fe-Cr-Ni alloy for the magnetic core, an example of a thin-film magnetic head as shown in FIG. 3 was prepared. In the thin-film magnetic head, at least a part of a magnetic path constituting a magnetic circuit is implemented by using the soft-magnetic multilayer thin film of the present embodiment.

As shown in FIG. 3, the magnetic circuit is comprised of an upper magnetic layer 4 and a lower magnetic layer 7 forming a magnetic loop shown by arrows in the figure. In FIG. 3, the thin film magnetic head comprises a coil conductive layer 5 and a coil insulating layer member 6 included between the upper and lower magnetic layers 4 and 7 both formed on a non-magnetic substrate 8. That is, in a thin-film magnetic head produced by using a soft-magnetic multilayer thin film magnetically isolated from each other, the soft-magnetic multilayer thin film serves as at least one of an upper magnetic core layer and a lower magnetic core layer.

Evaluation was made upon input/output and noise thereof by using the thin-film heads each having a total film thickness of 2 μm (i.e., each of the upper and lower magnetic layers 4 and 7 having a thickness of 2 μm), a number of turns of the coil of 15 turns×2 layers, a gap length of 0.5 μm, a track width of 10 μm, and an HDD with a medium of 1300 Oe. Consequently, the thin-film magnetic head using the multilayer film as shown in FIG. 2 showed improved output characteristics especially on the high band region better than those using the single-layer film for the core of the head, and moreover showed noise reduction to a degree of significant difference.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

TABLE 1

| Material of plated layer | Material of effect layer | $I_1$ (mA) | $I_2$ (mA) | TEM analysis result | | Magnetic domain structure |
|---|---|---|---|---|---|---|
| | | | | Plated layer | Effect layer | |
| Permalloy | Ni—Fe | 100 | 0 | fcc | | Multiple domain within thin-film plane |
| Permalloy | Ni—Fe | 100 | 30 | fcc | Amorphous | Single domain except peripheral regions |
| Permalloy | Ni—Fe | 100 | 50 | fcc | Amorphous | Single domain within pattern |
| Permalloy | Ni—Fe | 100 | 70 | fcc | Amorphous | Single domain within pattern |
| Co—Fe—Cr | | 100 | 0 | fcc + hcp | | Multiple domain within thin-film plane |
| Co—Fe—Cr | | 200 | 0 | fcc + hcp | | Multiple domain within thin-film plane |
| Co—Fe—Cr | Co—Fe—Cr | 200 | 50 | fcc + hcp | Amorphous | Single domain within pattern |
| Co—Fe—Cr | Co—Fe—Cr | 200 | 100 | fcc | Amorphous | Single domain within pattern |
| Co—Fe | | 100 | 0 | fcc + bcc | | Multiple domain within thin-film plane |

TABLE 1-continued

| Material of plated layer | Material of effect layer | $I_1$ (mA) | $I_2$ (mA) | TEM analysis result Plated layer | Effect layer | Magnetic domain structure |
|---|---|---|---|---|---|---|
| Co—Fe | Co—Fe | 100 | 30 | fcc + bcc | Amorphous | Single domain except peripheral regions |
| Co—Fe | Co—Fe | 100 | 50 | fcc | Amorphous | Single domain within pattern |
| Co—Fe | Co—Fe | 100 | 70 | fcc | Amorphous | Single domain within pattern |
| Fe—Cr | Fe—Cr | 100 | 0 | bcc |  | Multiple domain within thin-film plane |
| Fe—Cr | Fe—Cr | 200 | 0 | bcc |  | Multiple domain within thin-film plane |
| Fe—Cr | Fe—Cr | 200 | 50 | bcc | Amorphous | Single domain within pattern |
| Fe—Cr | Fe—Cr | 200 | 100 | bcc | Amorphous | Single domain within pattern |

TABLE 2

| Material of plated layer | $I_1$ (mA) | $I_2$ (mA) | Coercive force (Oe) | Magnetic permeability 1 MHz | 10 MHz |
|---|---|---|---|---|---|
| Permalloy | 100 | 0 | 0.5 | 1921 | 1156 |
| Permalloy | 100 | 30 | 0.3 | 2990 | 1539 |
| Permalloy | 100 | 50 | 0.3 | 3127 | 1743 |
| Permalloy | 100 | 70 | 0.15 | 3539 | 2156 |
| Co—Fe—Cr | 100 | 0 | 20 | 253 | 179 |
| Co—Fe—Cr | 200 | 0 | 11 | 435 | 273 |
| Co—Fe—Cr | 200 | 50 | 3 | 856 | 530 |
| Co—Fe—Cr | 200 | 100 | 1 | 1036 | 785 |
| Co—Fe | 100 | 0 | 1.35 | 1574 | 1187 |
| Co—Fe | 100 | 30 | 0.7 | 1532 | 1358 |
| Co—Fe | 100 | 50 | 0.4 | 1635 | 1479 |
| Co—Fe | 100 | 70 | 0.35 | 1775 | 1650 |
| Fe—Cr | 100 | 0 | 0.9 | 1668 | 1445 |
| Fe—Cr | 200 | 0 | 0.5 | 1756 | 1563 |
| Fe—Cr | 200 | 50 | 0.35 | 1797 | 1624 |
| Fe—Cr | 200 | 100 | 0.3 | 1853 | 1763 |

What is claimed is:

1. A method of manufacturing a soft-magnetic multilayer thin film, which comprises the steps of:

intermittently dissolving an electroplated soft-magnetic film layer by anodic dissolution while forming the layer on a surface to be plated by electroplating, to form a re-dissolution effect layer which is a magnetically isolating layer having a crystal structure different from that of the soft-magnetic film layer; and forming a soft-magnetic multilayer thin film which comprises a plurality of soft-magnetic film layers magnetically isolated from each other by re-dissolution effect layers interposed therebetween.

2. The method as claimed in claim 1, wherein said soft-magnetic film layer is formed by electroplating with a d.c. forwarding current under a condition that the surface to be plated is positioned as a cathode in an electroplating solution with a d.c. current source, while said re-dissolution effect layer is formed with a d.c. bias current intermittently supplied in the reverse direction with respect to that of the plate-forwarding current under a condition that the surface to be plated is positioned as an anode in the electroplating solution.

3. The method as claimed in claim 2, wherein the reverse d.c. bias current is set in absolute value to be smaller than the plate-forwarding current.

* * * * *